United States Patent
Sheinfeld et al.

(10) Patent No.: US 8,631,115 B2
(45) Date of Patent: Jan. 14, 2014

(54) CONNECTIVITY OUTAGE DETECTION: NETWORK/IP SLA PROBES REPORTING BUSINESS IMPACT INFORMATION

(75) Inventors: Gil Mati Sheinfeld, Sunnyvale, CA (US); Andrew John Ballantyne, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 1054 days.

(21) Appl. No.: 11/549,913

(22) Filed: Oct. 16, 2006

(65) Prior Publication Data

US 2008/0091822 A1 Apr. 17, 2008

(51) Int. Cl.
*G06F 11/00* (2006.01)

(52) U.S. Cl.
USPC ........... 709/224; 370/242; 370/252; 370/400; 370/241

(58) Field of Classification Search
USPC ........................................................ 709/223
See application file for complete search history.

(56) References Cited

U.S. PATENT DOCUMENTS

| | | | |
|---|---|---|---|
| 6,366,563 B1* | 4/2002 | Weldon et al. | 370/252 |
| 6,405,250 B1* | 6/2002 | Lin et al. | 709/224 |
| 2004/0139194 A1* | 7/2004 | Naganathan | 709/224 |
| 2005/0022189 A1* | 1/2005 | Proulx et al. | 718/100 |
| 2006/0072474 A1* | 4/2006 | Mitchell | 370/252 |
| 2006/0267756 A1* | 11/2006 | Kates | 340/521 |
| 2007/0171834 A1* | 7/2007 | Sathyanarayana et al. | 370/241 |
| 2007/0297337 A1* | 12/2007 | Beygelzimer et al. | 370/241 |
| 2008/0056141 A1* | 3/2008 | Sheinfeld et al. | 370/244 |

\* cited by examiner

*Primary Examiner* — Andrew Goldberg
(74) *Attorney, Agent, or Firm* — Patterson & Sheridan, LLP

(57) ABSTRACT

Techniques for accurate determination of service impact are provided by provisioning network deployed probes with actual business object information related to business entities, such as VPN sites. Such probes are capable of sending a network trap (or alarm) containing actual business information in response to detecting a loss of connectivity. As a result, service impact caused by the loss of connectivity may be determined accurately by simply parsing the contents of a network trap, thus avoiding the complication and inaccuracy of conventional impact analysis.

14 Claims, 5 Drawing Sheets

DETECT LOSS IN CONNECTIVITY

CONNECTIVITY OUTAGE DETECTION: NETWORK/IP SLA PROBES REPORTING BUSINESS IMPACT INFORMATION

BACKGROUND OF THE INVENTION

1. Field of the Invention

Embodiments of the present invention generally relate to network management and, more particularly, to enabling network devices to report business impact information to a network management system.

2. Description of the Related Art

Network services have changed dramatically in recent years, particularly with the migration of sensitive data from the confines of company Intranets to provider networks that carry data for multiple customers over a single network core. For example, voice, video, and other business data, is now commonly sent over virtual private networks (VPNs) established over service provider core networks. Such VPNs provide security and separation by preventing the communication of data between sites that are not part of the same VPN.

As business entities come to rely more and more on service provider core networks, Service Level Agreements play an increasingly important role in their relationship with service providers. SLAs typically contain provisions that specify a guaranteed level of service and penalty provisions for not meeting the specified level of service. In order to measure level of service, tools have been developed that provide information about network traffic that allows network performance to be monitored and also provides insight into the network that aids providers in providing reliable service.

One such tool, commonly referred to as a network probe, actively generates and monitors network traffic to gather information indicative of network performance. Network probes may be implemented on existing network devices, such as routers and switches, or in dedicated devices, such as a dedicated router to offload the required processing. In either case, by actively generating traffic that specifically targets devices in a given network path, network probes may enable the detection of network deficiencies that might not be found using non-intrusive techniques.

Results of probe operations may be kept internally by the device in which the probe is implemented and accessed, for example, via the device command line interface. Results may also be exposed to network management applications, for example, via the simple network management protocol (SNMP). Network probes may be configured to send a notification (commonly referred to as a trap) to a network management system (or fault manager) upon detection of a significant event, such as a loss in connectivity or the reduction in service level below a specified threshold amount. A trap may alert an operator or an administrator the traffic data transport has degraded or failed, indicating a network problem, such as malfunctioning or failing equipment and congestion.

On the network management side, upon receiving an alarm notification (via a trap sent by a probe), an impact analysis may be performed in an attempt to determine the business impact of the reported failure (e.g., what customers are effected and how). Unfortunately, there is typically only a limited amount of information provided in conventional network alarms, such as an identification of the device implementing the probe and a monitored destination targeted by a corresponding probe operation.

As a result, it may be extremely difficult to make an accurate determination as to which service or services are impacted by the reported failure based on this limited information. Therefore, the information gained by conventional impact analysis will typically be, at best, a statement of potential impact which may be inaccurate due to various factors, such as route path re-convergence and the existence of multiple paths. Further, determining the business entities affected, such as particular customer VPNs, based on traditional fault analysis is a potentially expensive processing activity which may need to be repeated each time a fault is detected.

Accordingly, what is needed is an improved technique for determining the business impact of a detected network failure.

SUMMARY OF THE INVENTION

Embodiments of the present invention generally provide techniques and apparatus for determining the business impact of a change in a network connection are provided.

One embodiment provides a method of conveying the business impact of a loss of connectivity between two points in a network. The method generally includes receiving, by a device attached to the network, business impact information pertaining to a business service, creating, at the device, a probe to monitor network traffic on a connection involved in the business service, detecting a change in connectivity on the connection, and, in response to the detected change, populating a data structure containing the business impact information.

One embodiment provides a method of determining business impact of a loss of connectivity detected in a network. The method generally includes receiving business impact information relating to a business service provided over the network, provisioning at least one probe deployed in the network to monitor traffic with the business impact information, and detecting a change in connectivity and obtaining the business impact information from the at least one provisioned probe.

One embodiment provides a network device. The network device generally includes an interface for receiving business impact information pertaining to a business service and logic for monitoring network traffic on a connection involved in the business service and, in response to detecting a change in the connection, populating a data structure containing the business impact information.

One embodiment provides a network device generally including communications means for receiving business impact information pertaining to a business service and probing means for monitoring network traffic on a connection involved in the business service and, in response to detecting a change in the connection, populating a data structure containing the business impact information.

One embodiment provides a network management system. The system generally includes configuration logic for provisioning a network deployed probe with business impact information relating to a business service provided over the network, the network probe deployed in the network to monitor network traffic and fault management logic configured to detect a change in connectivity and obtain the business impact information from the at least one provisioned probe.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention allow for accurate determination of service impact by provisioning network deployed probes with actual business object information related to business entities, such as VPN sites. Such probes are capable of sending a network trap (or alarm) containing actual business information in response to detecting a loss of connectivity. As a result, service impact caused by the loss of connectivity may be determined accurately by simply parsing the contents of a network trap, thus avoiding the complication and inaccuracy of conventional impact analysis.

An Exemplary Network Architecture

Figure 1:
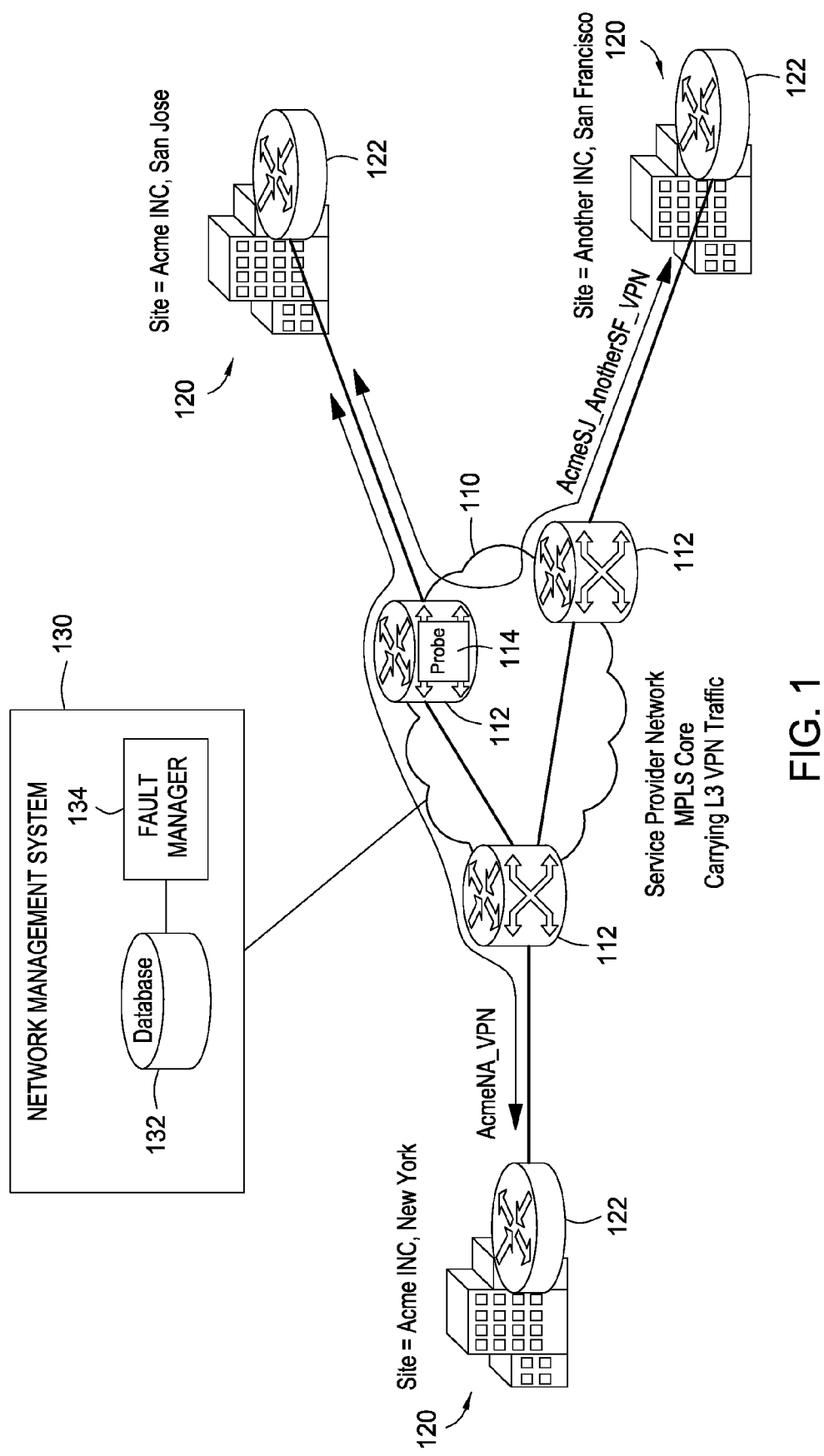
FIG. 1 illustrates an exemplary network topology in accordance with embodiments of the present invention.

FIG. 1 illustrates one example of a network architecture in which embodiments of the present invention may be utilized. The network generally includes a service provider network 110 that routes network traffic (e.g., of data, voice, and the like) between various customer sites 120. As illustrated, the customer sites 120 may connect to the service provider network 110 via customer edge (CE) routers 122 connected to provider edge (PE) routers 112 that are part of the provider network 110. While not shown, those skilled in the art will appreciate that the provider network 110 may also include a "fabric" of intermediate network devices, such as switches and routers that route and support traffic between the PE routers 112.

For some embodiments, the service provider network 110 may be a Multiprotocol Label Switching (MPLS) network that forwards internet protocol (IP) traffic using labels. These labels may instruct the routers and the switches in the provider network 110 where to forward packets as they are routed between PE routers 112 en route to CEs 122 at the customer sites 120 based on pre-established IP routing information.

The sites 120 may include sites from different business entities, as well as multiple sites from the same business entity (e.g., regional branch offices and headquarters). In the illustrated example, multiple sites for a first hypothetical business entity "Acme, Inc." and a single site for a second hypothetical business entity "Another, Inc." are shown.

In order to provide secure communications between sites, virtual private networks (VPNs) may be established, for example when routing traffic between sites within the same business entity over the provider network 110. VPNs enable IP traffic to be routed securely over the provider network 110 by preventing the communication of data between sites that are not part of the same VPN. In FIG. 1, two VPN connections are shown: "AcmeNA_VPN" established between New York and San Jose Acme sites of Acme, Inc. and "AcmeSJ_AnotherSF_VPN" established between the San Jose site of Acme and the San Francisco site of Another, Inc.

A network management system (NMS) 130 may be configured to monitor performance of the provider network 110, as traffic is exchanged over the VPNs. The NMS 130 may be implemented, for example, at a network operation center and may communicate with agents deployed in the provider network in an effort to help track network performance and the general health of network resources.

For example, a network probe 114 may be deployed in the network to actively generate and monitor network traffic to gather information indicative of network performance. The network probe 114 may be implemented on an existing network device, such as a PE router 112, as shown, or in dedicated devices. The traffic generated may be designed to travel the same path as other traffic on various VPN connections. Thus, the connectivity of specific portions of a VPN routing and MPLS switching path, such as PE-to-PE connections and/or PE-to-CE connections, may be monitored.

Results of probe operations may be kept internally and accessed by the NMS 130 via polling, for example, using information about the device contained in a Management Information Base (MIB) Database. Alternatively, the probe 114 may be configured to automatically send a network trap (alarm) to the NMS 130, upon detection of a significant event, such as a loss in connectivity or the reduction in service level above or below specified threshold amount.

Regardless of how the results are obtained, in conventional systems, a fault management function 134 of the NMS 130 would historically have to perform complicated and often inaccurate analysis of the business impact of a loss of connectivity (or other such event) due to the limited amount of information provided by conventional probes. However, embodiments of the present invention may overcome this problem by provisioning the probe 114 with actual business impact information. As a result, actual business information may be obtained directly (via probe-generated traps or polling) when a loss of connectivity is detected.

Propagating Business Impact Information to the Network

Figure 2:
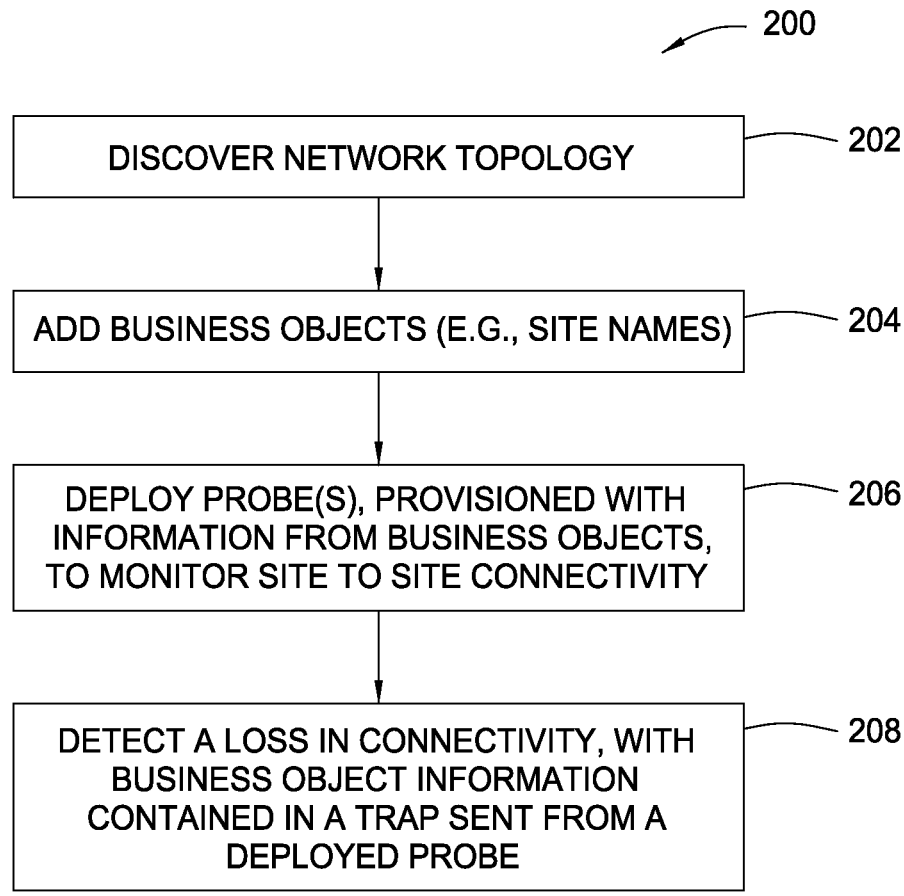
FIG. 2 is a flow diagram of exemplary operations in accordance with embodiments of the present invention.

FIG. 2 is a flow diagram of exemplary operations 200 that illustrate configuring and utilizing network probes to report business impact information, in accordance with embodiments of the present invention. The operations 200 may be described with reference to FIGS. 3A-3C which illustrate the exemplary network of FIG. 1, during discovery, deployment, and connectivity outage detection operations shown in FIG. 2.

Figure 3A:
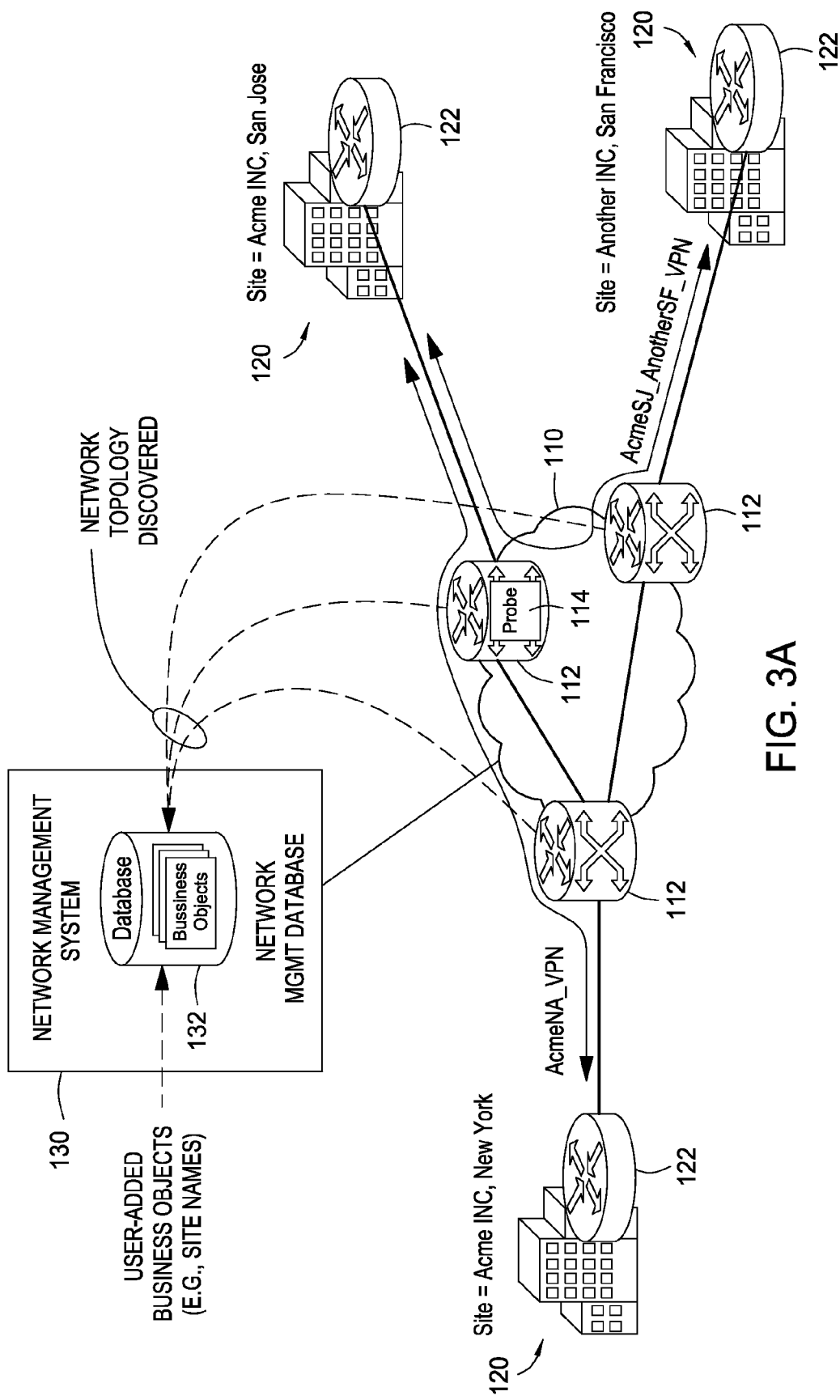
FIGS. 3A, 3B and 3C illustrate the exemplary topology of FIG. 1, during discovery, deployment and connectivity outage detection operations.

The operations 200 begin, at step 202, by discovering the network topology. For some embodiments, the network topology may be discovered utilizing a specialized protocol, such as the Cisco Discovery Protocol (CDP) established by Cisco Systems Inc. that allows network devices (switches, routers, access servers, bridges, and the like) to advertise its existence to other devices and receive information about other devices on the same network. As illustrated in FIG. 3A, information gathered in the discovery phase may be used to populate the network management database 132 at NMS 130.

After discovery, at step 204, corresponding business information may be added to the discovered device information. A user may add this information, for example, via a graphical user interface (GUI) in the form of data structures referred to herein as Business Objects. These Business Objects may include business information, such as site names (e.g., "Acme New York Office") and VPN names (e.g., "AcmeNA_VPN") given the VPN connections by the user, allowing these to be correlated with devices in VPN paths.

Figure 3B:
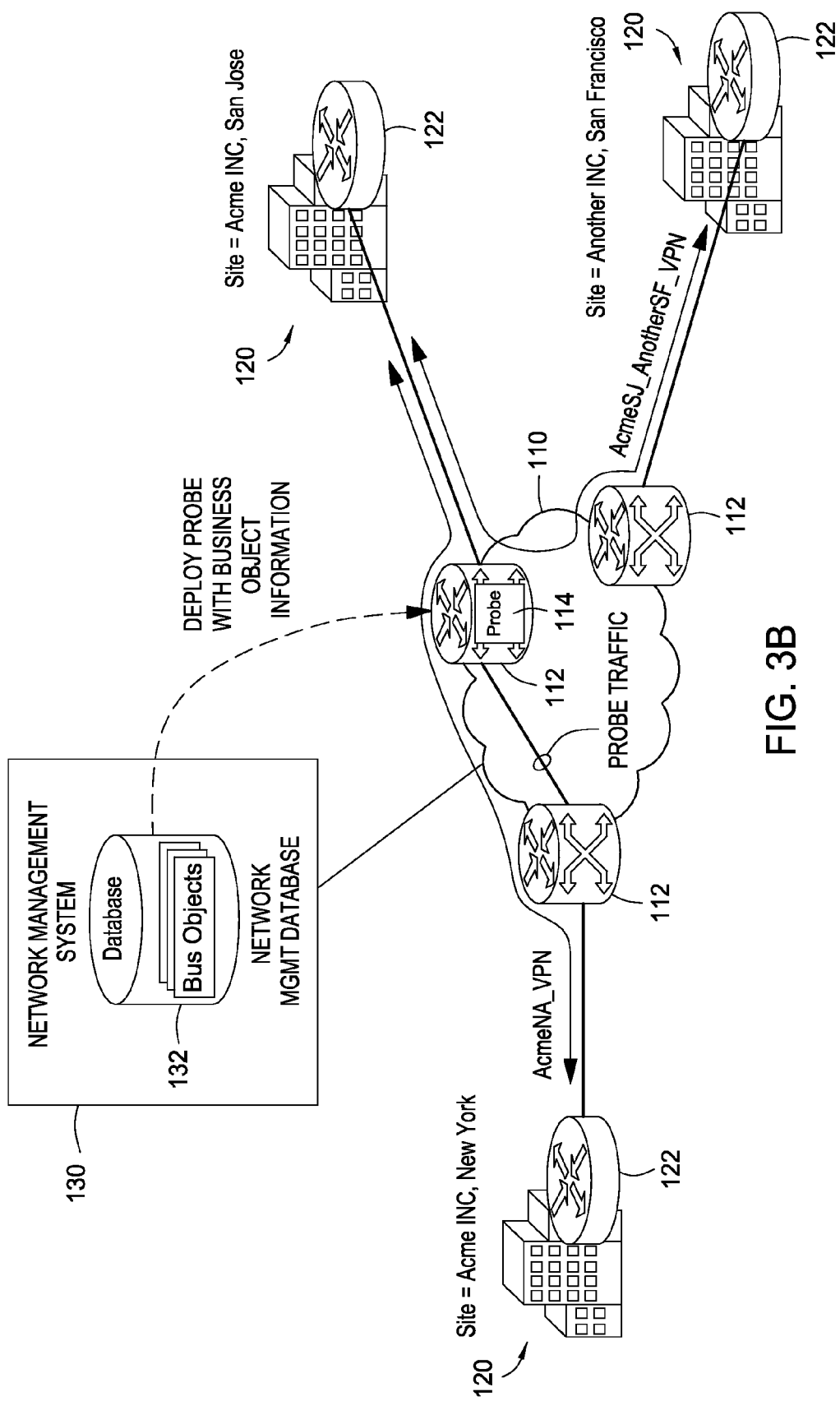

At step 206, probes provisioned with information from the business objects may be deployed in the network to monitor site-to-site connectivity. As illustrated in FIG. 3B, by provisioning probes in this manner, business impact information is propagated down into the network being monitored. Probe deployment and provisioning may involve writing to probe configuration files on the particular device in which the probe is implemented. For some embodiments, probes may be provisioned via GUI screens and/or command line interfaces through which various settings, such as events to monitor, types of traffic to monitor, frequency of monitoring packets, and the like, may all be specified.

As illustrated in FIG. 3B, the probe 114 may begin to generate and monitor probe traffic to verify connectivity. For some embodiments, these packets may be created specifically for connectivity verification, or ping testing, verifying responses from targeted destinations are received within a predetermined period. In addition to loss of connectivity, such packets may also allow quality of service to be measured, for example, based on measured/averaged round trip times and/or unanswered packets.

During the provisioning of the probe for Connectivity Outage Detection (COD) on MPLS based networks, various connection details of an interface, such as device and VPN routing/forwarding instance (VRF) for both a source and destination targeted by probed operations, may be placed in a data structure, referred to herein as a tag. A VRF generally includes the routing information that defines a customer VPN site that is attached to a PE router. VRF for both source and destination may be placed in this tag, as well as the VPN name given by the user.

Figure 3C:
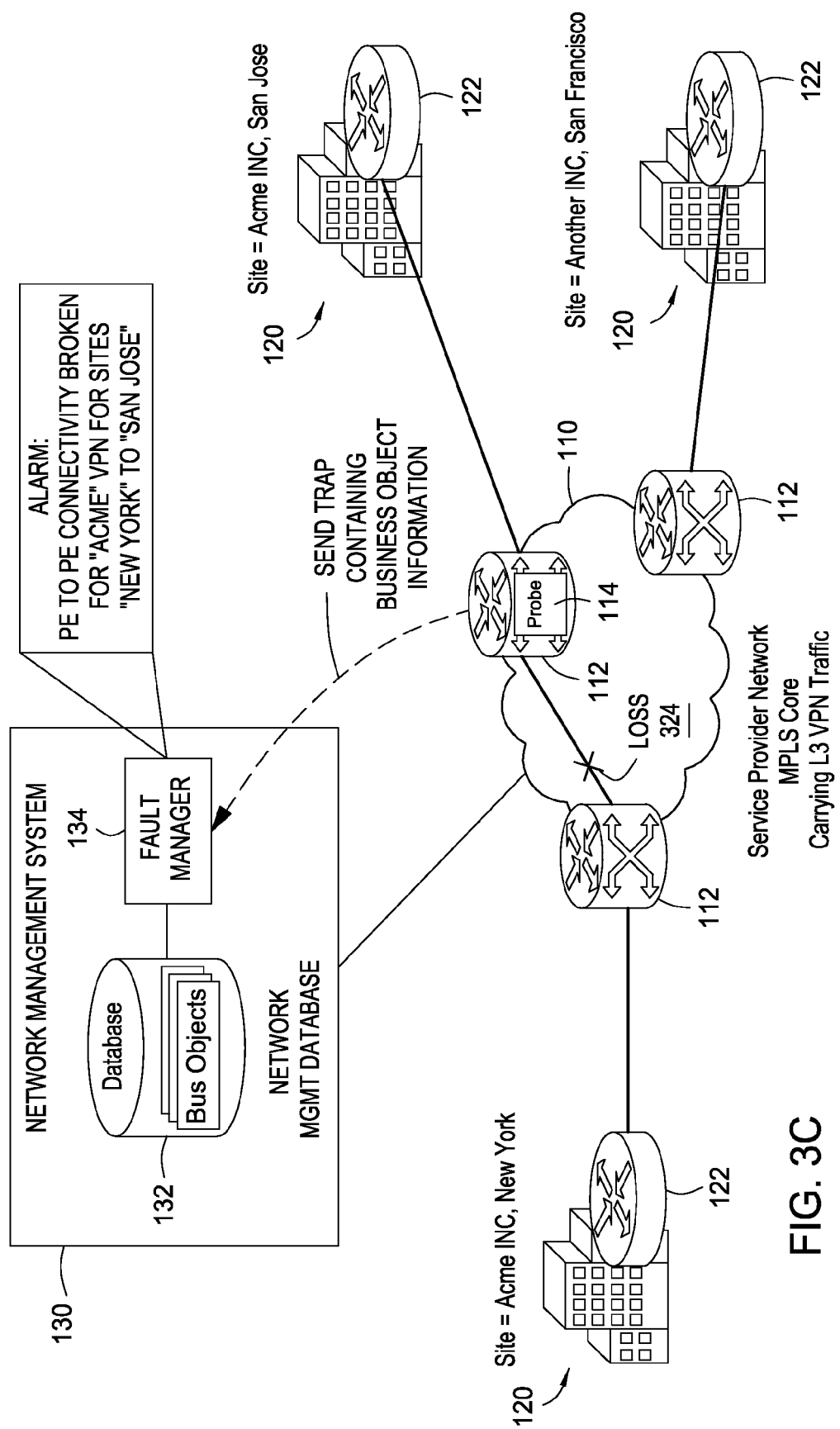

At step 208, a loss in connectivity may be detected, with business information contained in a trap sent from a deployed probe (or obtained via polling). To illustrate, a loss of connectivity 324 in the VPN ("AcmeNA_VPN") established between PE2 and PE1 is shown in FIG. 3C. The NMS 130 may be configured to parse the information contained in the tag, use it for fault correlation and notify a user. For example, using information parsed from the tag field, the NMS 130 may construct an alarm screen 136 that provides a user with a clear and accurate indication of the service impact of the detected loss in connectivity without having to perform complicated (and often inaccurate) impact analysis, as all of the information is already provided in the tag field of the trap.

Propagating Business Impact Information to the Network

Various types of information useful to identify the impact on business services of a detected loss in connectivity may be included in a probe tag field. For some embodiments, the information may be contained in a set of sub-fields as readable text. Table I below lists a set of sub-fields for one exemplary tag field, in accordance with embodiments of the present invention.

TABLE I

EXEMPLARY TAG FIELD

| SUB-FIELD NAME | FORMAT |
| --- | --- |
| VPN | <VPN> |
| Site | <SiteA>,<SiteB> |
| Type | <TYPE> |
| Source | <VRF$_S$>, <PE$_S$>, <IF$_S$>, <IP$_S$> |
| Destination | <VRF$_D$>, <PE$_D$>, <IF$_S$>, <IP$_D$> |

As illustrated, the sub-fields may include the (user-specified) VPN name, as well a description of sites between which the probe is deployed. As described above, the VPN name and business site information may be defined by the user during network topology discovery operations.

Type information may include the type of connection the probe is monitoring. As an example, available types might include connections between PE routers (PE-PE), between a provider edge and customer edge router (PE-CE), or with any type of generic access circuits (ACs). PE Source (PE$_S$) and PE Destination (PE$_D$) may be either a host name or an IP address. For ACs, the information in the subfields will be the same for PE and VRF, such that redundant information may be removed for this type. As described above, these details and site information may have been correlated with network details (e.g., network addresses and VPN routing information) obtained during discovery.

Figure 4:
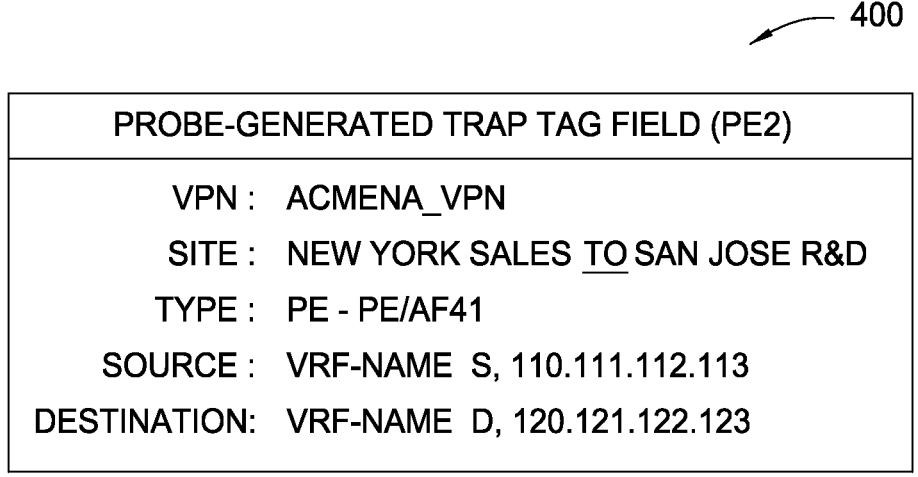
FIG. 4 illustrates an exemplary format of a tag field of a trap reported when a connectivity outage is detected in accordance with embodiments of the present invention.

FIG. 4 illustrates a tag field 400 with exemplary populated sub-fields, corresponding to the probe 114 deployed in PE router PE2 shown in FIGS. 3A-3C. As illustrated, the tag field 400 includes a user-specified VPN name, "AcmeNA_VPN" and the sites between which traffic is being monitored ("New York Sales" and "San Jose R&D"). In this example, the connection type is PE-PE (between PE1 and PE2), with the Source and Destination sub-fields listing exemplary VRF and IP address data for the PE routers (PE1 and PE2).

By passing this information down to the probe, an attempt to reconstruct this correlation does not need to be made during impact analysis after a loss of connectivity has occurred. Rather, accurate business impact information may be parsed from the tag field, which may be fast and accurate. As a result, upon detecting a loss in connectivity, a service provider may be able to quickly determine what customers and what services are impacted. Ideally, this may allow service providers to notify customers impacted before those customers notify them.

Conclusion

While the foregoing is directed to embodiments of the present invention, other and further embodiments of the invention may be devised without departing from the basic scope thereof, and the scope thereof is determined by the claims that follow.

What is claimed is:

1. A method of conveying loss of connectivity between two points in a network, comprising:
receiving, by a device attached to the network, network connectivity information pertaining to a network service, wherein the network connectivity information includes a plurality of metadata tags, each descriptive of a respective network connectivity attribute of the network service, wherein the plurality of metadata tags comprises:
a first tap specifying a user-defined name of a virtual private network connection involved in the network service,
a second tag specifying a type of the virtual private network connection,
a third tag specifying an indication of a first physical location affected by an interruption in the network service,
a fourth tag specifying an indication of a second physical location affected by the interruption in the network service, a fifth tag specifying routing information identifying a source router involved in the virtual private network connection, a sixth tag specifying routing information identifying a destination router involved in the virtual private network connection, and a seventh tag specifying VPN routing/forwarding instance (VRF) information for at least one of the source router and the destination router;

writing, at the device, the received network connectivity information to a probe to monitor network traffic on the virtual private network connection involved in the network service;

detecting, using the probe to which the network connectivity information was written, a change in connectivity on the virtual private network connection;

in response to the detected change, populating, by the probe, a predefined data structure with the network connectivity information; and generating a notification, using the network connectivity information from the populated predefined data structure, that describes a business impact of the change in connectivity for the network service, by describing the name and type of the virtual private network connection experiencing a change in connectivity, and specifying at least the first physical location and the second physical location as affected by the change in connectivity.

2. The method of claim 1, comprising sending the populated predefined data structure to the network management system in an automatically generated network alarm.

3. A method of determining loss of connectivity in a network, comprising:

receiving, by a device, network connectivity information relating to a network service provided over the network, wherein the network connectivity information includes a plurality of metadata tags, each descriptive of a respective network connectivity attribute of the network service, wherein the plurality of metadata tags comprises:

a first tag specifying a user-defined name of a virtual private network connection involved in the network service, a second tag specifying a type of the virtual private network connection, a third tag specifying an indication of a first physical location affected by an interruption in the network service, a fourth tag specifying an indication of a second physical location affected by the interruption in the network service, a fifth tag specifying routing information identifying a source router involved in the virtual private network connection, a sixth tag specifying routing information identifying a destination router involved in the virtual private network connection, and a seventh tag specifying VPN routing/forwarding instance (VRF) information for at least one of the source router and the destination router;

provisioning, by a device, at least one probe in the network to monitor traffic associated with the received network connectivity information, wherein the received network connectivity information is written to the at least one probe;

obtaining, by a device, a predefined data structure populated with the network connectivity information from the at least one provisioned probe, the probe having populated the predefined data structure using the network connectivity information written to the probe in response to detecting a change in connectivity for the virtual private network connection involved in the network service; and in response to obtaining the predefined data structure, generating a notification, by a device, using the network connectivity information from the populated predefined data structure, that describes a business impact of the change in connectivity for the network service, by describing the name and type of the virtual private network connection experiencing a change in connectivity, and specifying at least the first physical location and the second physical location as affected by the change in connectivity.

4. The method of claim 3, wherein detecting the change in connectivity and obtaining the network connectivity information from the at least one provisioned probe comprises polling.

5. The method of claim 3, wherein detecting the change in connectivity and obtaining the network connectivity information from the at least one provisioned probe comprises receiving a network alarm from the probe.

6. A network device containing a processor and memory, comprising:

an interface for receiving network connectivity information pertaining to a network service, the network connectivity information including a plurality of metadata tags, each descriptive of a respective network connectivity attribute of the network service, wherein the plurality of metadata tags comprises:

a first tag specifying a user-defined name of a virtual private network connection involved in the network service, a second tag specifying a type of the virtual private network connection, a third tag specifying an indication of a first physical location affected by an interruption in the network service, a fourth tag specifying an indication of a second physical location affected by the interruption in the network service, a fifth tag specifying routing information identifying a source router involved in the virtual private network connection, a sixth tag specifying routing information identifying a destination router involved in the virtual private network connection, and a seventh tag specifying VPN routing/forwarding instance (VRF) information for at least one of the source router and the destination router;

logic for, subsequent to receiving the network connectivity information, monitoring network traffic on the virtual private network connection involved in the network service using a probe and, in response to detecting a change in connectivity of the virtual private network connection, populating a predefined data structure with the received network connectivity information; and generating a notification, using the network connectivity information from the populated predefined data structure, that describes a business impact of the change in connectivity for the network service, by describing the name and type of the virtual private network connection experiencing a change in connectivity, and specifying at least the first physical location and the second physical location as affected by the change in connectivity.

7. The network device of claim 6, wherein the logic is configured to send the data structure to a network management system in a network alarm message.

8. A network device containing a processor and memory, comprising:
   means for receiving network connectivity information pertaining to a network service, the network connectivity information including a plurality of metadata tags, each descriptive of a respective network connectivity attribute of the network service, wherein the plurality of metadata tags comprises:
      a first tag specifying a user-defined name of a virtual private network connection involved in the network service,
      a second tag specifying a type of the virtual private network connection,
      a third tag specifying an indication of a first physical location affected by an interruption in the network service,
      a fourth tag specifying an indication of a second physical location affected by the interruption in the network service,
      a fifth tag specifying routing information identifying a source router involved in the virtual private network connection,
      a sixth tag specifying routing information identifying a destination router involved in the virtual private network connection, and
      a seventh tag specifying VPN routing/forwarding instance (VRF) information for at least one of the source router and the destination router;
   means for, subsequent to receiving the network connectivity information, monitoring network traffic on the virtual private network connection involved in the network service using a probe and, in response to detecting a change in connectivity of the virtual private network connection, populating a predefined data structure with the received network connectivity information; and
   means for generating a notification, using the network connectivity information from the populated predefined data structure, that describes a business impact of the change in connectivity for the network service, by describing the name and type of the virtual private network connection experiencing a change in connectivity, and specifying at least the first physical location and the second physical location as affected by the change in connectivity.

9. The network device of claim 8, wherein the probing means is configured to send the data structure to a network management system in a network alarm message.

10. The network device of claim 9, wherein the network connectivity information is contained as text in a field of the network alarm message.

11. A network management system containing a processor and memory, comprising:
   configuration logic for provisioning a network probe in a network, with network connectivity information relating to a network service provided over the network written to the network probe, the network probe deployed in the network to monitor network traffic on a connection involved in the network service, wherein the network connectivity information includes a plurality of metadata tags, each descriptive of a respective network connectivity attribute of the network service, wherein the plurality of metadata tags comprises:
      a first tag specifying a user-defined name of a virtual private network connection involved in the network service,
      a second tag specifying a type of the virtual private network connection,
      a third tag specifying an indication of a first physical location affected by an interruption in the network service,
      a fourth tag specifying an indication of a second physical location affected by the interruption in the network service,
      a fifth tag specifying routing information identifying a source router involved in the virtual private network connection,
      a sixth tag specifying routing information identifying a destination router involved in the virtual private network connection, and
      a seventh tag specifying VPN routing/forwarding instance (VRF) information for at least one of the source router and the destination router;
   fault management logic configured to obtain a predefined data structure populated with the network connectivity information from the at least one provisioned probe, the at least one provisioned probe having populated the predefined data structure using the network connectivity information written to the at least one provisioned probe in response to detecting a change in connectivity on the virtual private network connection involved in the network service, wherein the fault management logic is further configured to generate a notification, using the network connectivity information from the populated predefined data structure, that describes a business impact of the change in connectivity for the virtual private network connection, by describing the name and type of the virtual private network connection experiencing a change in connectivity, and specifying at least the first physical location and the second physical location as affected by the change in connectivity.

12. The network management system of claim 11, further comprising:
   business object logic allowing a user to enter the network connectivity information.

13. The network management system of claim 11, wherein the fault management logic is configured to detect a loss in connectivity and obtain the predefined data structure from the at least one provisioned probe by receiving a network alarm from the probe.

14. A network management system containing a processor and memory, comprising:
   means for provisioning a network probe in a network with network connectivity information relating to a network service provided over the network written to the network probe, the network probe deployed in the network to monitor network traffic on at least one connection involved in the network service, wherein the network connectivity information includes a plurality of metadata tags, each descriptive of a respective network connectivity attribute of the network service, wherein the plurality of metadata tags comprises:
      a first tag specifying a user-defined name of a virtual private network connection involved in the network service,
      a second tag specifying a type of the virtual private network connection,
      a third tag specifying an indication of a first physical location affected by an interruption in the network service, a fourth tag specifying an indication of a second physical location affected by the interruption in the network service, a fifth tag specifying routing information identifying a source router involved in the virtual private network connection, a sixth tag specifying routing information identifying a destination router involved in the virtual private network connection, and a seventh tag specifying VPN routing/forwarding instance (VRF) information for at least one of the source router and the destination router;

means for obtaining a predefined data structure populated with the network connectivity information from the at least one provisioned probe, the at least one provisioned probe having populated the predefined data structure using the network connectivity information written to the at least one provisioned probe upon detecting a change in connectivity on the virtual private network connection involved in the network service, wherein the populated predefined data structure is configured for use in generating a notification, using the network connectivity information from the populated predefined data structure, that describes a business impact of the change in connectivity for the virtual private network connection, by describing the name and type of the virtual private network connection experiencing a change in connectivity, and specifying at least the first physical location and the second physical location as affected by the change in connectivity.

* * * * *

UNITED STATES PATENT AND TRADEMARK OFFICE
CERTIFICATE OF CORRECTION

PATENT NO.        : 8,631,115 B2
APPLICATION NO.   : 11/549913
DATED             : January 14, 2014
INVENTOR(S)       : Sheinfeld et al.

Page 1 of 1

It is certified that error appears in the above-identified patent and that said Letters Patent is hereby corrected as shown below:

In the Claims:

Column 6, Claim 1, Line 57, please delete "tap" and insert -- tag -- therefor.

Signed and Sealed this
Sixth Day of May, 2014

Michelle K. Lee
*Deputy Director of the United States Patent and Trademark Office*